United States Patent [19]

Sakaguchi

[11] 4,235,722
[45] Nov. 25, 1980

[54] LIQUID TREATING UNIT

[75] Inventor: Yasuhiro Sakaguchi, Yokohama, Japan

[73] Assignee: Daicel Ltd., Sakai, Japan

[21] Appl. No.: 906,076

[22] Filed: May 15, 1978

[30] Foreign Application Priority Data

Jun. 13, 1977 [JP] Japan ............................ 52/77449[U]
Jul. 11, 1977 [JP] Japan ................................. 52/82686
Sep. 28, 1977 [JP] Japan .......................... 52/130859[U]
Dec. 20, 1977 [JP] Japan ................................ 52/172560

[51] Int. Cl.³ ............................................ B01D 31/00
[52] U.S. Cl. .................................. 210/247; 210/355; 210/433 M; 210/443 M; 210/450
[58] Field of Search ......... 55/158; 210/321 R, 433 M, 210/443 M, 247, 355, 450

[56] References Cited

U.S. PATENT DOCUMENTS

| | | | |
|---|---|---|---|
| 3,266,223 | 8/1966 | Presser et al. | 55/158 |
| 3,442,388 | 5/1969 | Pall | 210/321 B |
| 3,448,862 | 6/1969 | Kudlaty | 210/493 X |
| 3,494,465 | 2/1970 | Nyrop | 210/433 M X |
| 4,022,692 | 5/1977 | Tanneck | 210/321 B |

FOREIGN PATENT DOCUMENTS

548246 11/1957 Canada ..................................... 210/321

Primary Examiner—Frank A. Spear, Jr.
Attorney, Agent, or Firm—Hubbell, Cohen, Stiefel & Gross

[57] ABSTRACT

A liquid treating unit includes a module comprising a channel member for collecting a product liquid for recovery; a semipermeable membrane member liquid-tightly joined to the channel member and made from a semipermeable membrane strip by alternately folding the strip longitudinally thereof to provide feed liquid passages and product liquid passages on the front and rear sides of the membrane respectively, each pair of product liquid passages defining leaf portions of the membrane being adhered at each end of the passage to liquid-tightly close the product liquid passage only; spacers inserted into the feed liquid passages; and a covering member surrounding the outer periphery of the membrane member. The feed liquid passages therefore have a regulated cross sectional area to permit the feed liquid to flow through the passages in parallel and straight direction at an increased speed relative to the membrane surface, ensuring a reduction in dead space and efficient use of the membrane. The membrane surface defining the feed liquid passages can be cleaned with ease.

14 Claims, 19 Drawing Figures

LIQUID TREATING UNIT

BACKGROUND OF THE INVENTION

This invention relates to liquid treating units.

Liquid treating units are known which incorporate a semipermeable membrane for removing dissolved inorganic or organic substances from aqueous solutions or for the separation or concentration of high-molecular-weight substances such as proteins, starches and colloidal dispersed materials. Such known liquid treating units are divided into five general types according to the shape of the semipermeable membrane used: the tubular type (U.S. Pat. No. 3,616,929, No. 3,769,128 and No. 3,873,665), the hollow fiber type (U.S. Pat. No. 3,442,002, No. 3,339,341 and No. 3,246,764), the plate-and-frame type (Japanese Patent Application Disclosure No. 70280/1975), the spiral type (U.S. Pat. No. 3,542,203, No. 3,554,378 and No. 3,746,591) and the pleat type (Japanese Patent Application Disclosure No. 802791975). Of these, the spiral type which is simple in construction is most widely used, whereas the pleat type has not been in wide use.

SUMMARY OF THE INVENTION

This invention provides useful liquid treating units of the pleat type incorporating a semipermeable membrane, and more particularly, a liquid treating unit including a pressure resistant hollow cylinder, a semipermeable membrane module housed in the cylinder and seal means closing the space defined by the module and the cylinder. The semipermeable membrane module comprises means defining a liquid collector channel for collecting a product liquid for recovery, at least one semipermeable membrane member joined to the channel defining means and made from a semipermeable membrane strip of synethetic resin with or without a backing fabric attached at least to the opposite side edges of the membrane, the membrane being alternately folded longitudinally thereof to provide a plurality of feed liquid passages on its front side and a plurality of product liquid passages on its rear side, an adhesive layer adhering each pair of product liquid passage defining leaf portions of the membrane at each passage end to liquid-tightly close the product liquid passages only, the layer liquid-tightly adhering the membrane member at least to the periphery of the channel defining means, a spacer inserted into each of the feed liquid passages, and an openable covering member covering the semipermeable membrane member.

DESCRIPTION OF THE PREFERRED EMBODIMENTS

When liquid treating unit including a semipermeable membrane is loaded with the feed liquid to excess, the inorganic or organic substance concentrated on the membrane surface or between the opposed surface portions of the membrane accumulates and tends to cause concentration polarization or directly clogs up the membrane, resulting in a reduced separation efficiency. The membrane is therefore cleaned by a physical or chemical method. It is strongly desired to fully clean the membrane with ease.

This invention provides improved liquid treating units in which the membrane can be cleaned easily and sufficiently and which includes a reduced dead space for the feed of liquid to ensure efficient use of the membrane.

The synthetic resin semipermeable membranes to be used for the semipermeable membrane member of this invention are not particularly limited and include, for example, cellulose acetate membranes, cellulose acetate butyrate membranes, acrylonitrile copolymer membranes and polyamide membranes. Such a semipermeable membrane is shaped into a strip and alternately folded longitudinally thereof to provide a plurality of feed liquid passages on its front side and a plurality of product passages on its rear side. The phantom plane through the ridges of the resulting folds may be straight or curved. In the former case, the membrane is folded into a rectangular parallelepipedal mass, whereas in the latter case the membrane is folded, for example, into cylindrical form with its folded leaves extending radially from the center of the cylinder as spaced apart uniformly along the circumference.

According to this invention, a backing fabric is attached at least to the opposite side edges of the membrane. This means that the backing fabric is attached to the membrane on its rear side for defining the product liquid passages along the side edges. The backing fabric serves to define the product liquid passages on the rear side of the folded membrane by being adhered at the opposite side edges of the folded membrane and also serves to reinforce the semipermeable membrane. Although it is preferable to attach the backing to the entire rear surface of the membrane, the backing may be attached only to the portions to be adhered. When the backing fabric is not used or when it is attached to only the adhering portions, a suitable spacer such as a net, especially a plastics net, may be inserted into each of the product liquid passages to form a sufficient flow space.

According to this invention, the backing fabric is adhered to the rear side of the strip of synethetic resin semipermeable membrane integrally therewith. The fabric can be made of material known in the art. Examples of useful fabrics are canvases, nonwoven fabrics, tricot, filter paper, fabrics of coarse texture, etc., among which polyester canvas is most preferable.

In this invention, each pair of product liquid passages defining leaf portions of the membrane member are adhered at their opposite ends to close the ends of the product liquid passage only. The membrane member is further adhered to means for defining a liquid collector channel for collecting the product liquid for recovery. The membrane member and the channel defining means are left open at their opposite ends but are detachably covered with an openable covering member. The resulting assembly provides a semipermeable membrane module, which is housed, for example, in a pressure resistant hollow cylinder to serve as a separating or concentrating device.

The semipermeable membrane member may be adhered to the channel defining means by various methods. It is preferable to recess each of the opposite end faces of the channel defining means or a portion of the end face adjacent the membrane member approximately by the width of the adhesive which closes the product liquid passages at that end and to form in the recessed space a layer of adhesive for adhering the rear side of the membrane member to the end of the channel defining means. As compared with the case in which such a recess is not provided, namely when the wall of the channel defining means is in contact with the rear side of the membrane member, the recess provides a greater space for the adhesion of the membrane member to the channel defining means and results in greater advantages in workability, liquid-tightness and mechanical bond strength.

The liquid collector channel defining means is made of metal such as stainless steel or plastics such as polyvinyl chloride resin. Examples of useful channel defining means are hollow cylindrical or hollow rectangular parallelepipedal members formed with a large number of perforations and porous members made (for example from porous sintered metal or porous plastics) in the form of a solid porous cylinder or rectangular parallelepiped or of a hollow cylinder or rectangular parallelepiped. When smooth-surfaced, such members may preferably be surface-treated to ensure good adhesion with an adhesive.

The adhesive layer may be made wholly from an adhesive alone or from an adhesive and fibers admixed therewith to give increased strength. Alternatively, the adhesive layer may comprise a synthetic resin shaped portion which is adapted to be adhered to the rear side of the membrane member and to the end of the channel defining means. Such means is inexpensive to make and suitable for quantity production.

This invention will be described below in greater detail with reference to the accompanying drawings. 1. Liquid treating units of the pleat type including liquid collector channel defining means in the form of a rectangular parallelepiped are described below.

FIGS. 1 to 4 show a liquid treating unit So of the pleat type mainly comprising a horizontal pressure resistant hollow cylinder P and a module E housed in and supported by the cylinder P coaxially therewith. The module E mainly comprises a horizontal water collector tube M made from sintered porous metal and serving as liquid collector channel defining means, upper and lower semipermeable membrane members 1, 1a, front and rear adhesive layers 2, 3 connecting the membrane members 1, 1a to the water collector tube M, and an openable plastics cover 4 separable into an upper and a lower portion and surrounding the outer periphery of the membrane members 1, 1.

The semipermeable membrane member 1 is made from a strip of synthetic resin semipermeable membrane 5 with a backing fabric 6 attached to the entire rear surface of the membrane 5, by folding the membrane longitudinally thereof to provide a plurality of transversely extending feed liquid passages S on its front side and similar product liquid passages F on its rear side, the passages S and F being defined by the adjacent leaves Ns, Ns; . . . and Nf, Nf; . . . respectively. A netlike spacer 7 is inserted into each of the feed liquid passages S. On the other hand, the product liquid passages F are closed only at their opposite ends by adhesive layers 8. Thus the pair of leaf portions Nf, Nf . . . defining each of the product liquid passages F are liquid-tightly adhered together. Since the other semipermeable membrane member 1a has exactly the same construction as described above, the member 1a will not be described. The two membrane members 1, 1a are symmetrically arranged on the upper and lower sides of the water collector tube M serving as liquid collector channel defining means, with their rear sides (the backing sides or product liquid passage defining sides) in contact with the water collector tube M. To join the membrane members 1, 1a to the water collector tube M, the opposite ends of the tube M are recessed from the corresponding edge faces of the membrane members 1, 1a by an amount corresponding to the width of the adhesive layers 8. The rear faces of the adhesive layers 8 provided for the product liquid passages F of the membrane members 1, 1a are adhered to the recessed ends of the water collector tube M by adhesive layers 2, 3. These adhesive layers 8, 2, 3 are formed from a synthetic resin adhesive of epoxy resin, urethane resin, silicone resin or the like. The module E is detachably surrounded by a plastic cover 4 which is openable by separation. The plastic cover 4 comprises a usual plastics sheet, two separable channel-shaped frames fitting over the sheet, and a polyvinyl chloride tape for fixedly adhering the frames together from outside.

Figure 1:
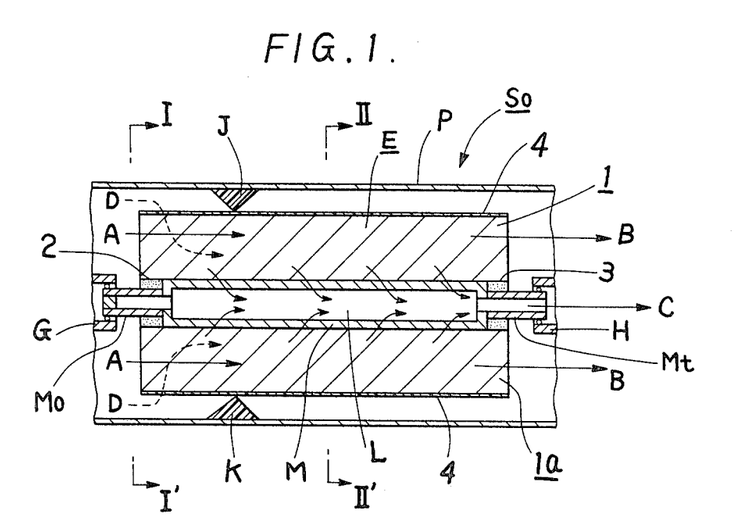
FIG. 1 is a view in longitudinal section showing a liquid treating unit according to this invention.
Figure 2:
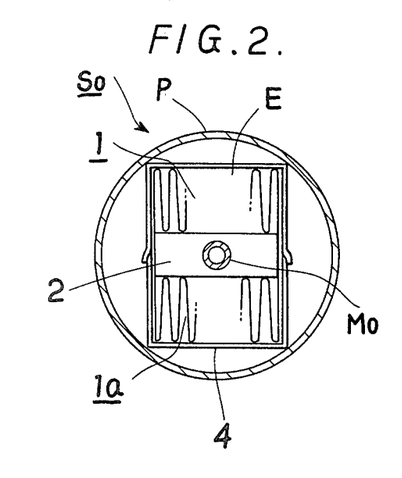
FIG. 2 is a view in section taken along the line I—I' in FIG. 1.
Figure 3:
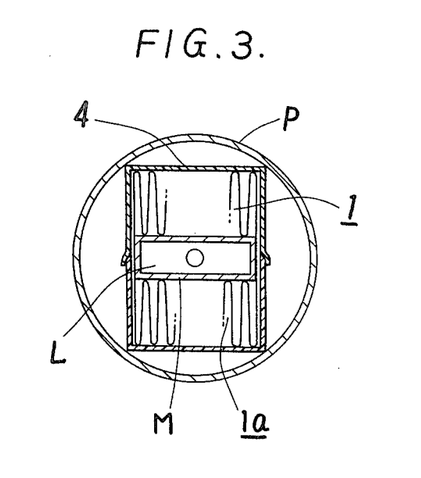
FIG. 3 is a view in section taken along the line II—II' in FIG. 1.
Figure 4:
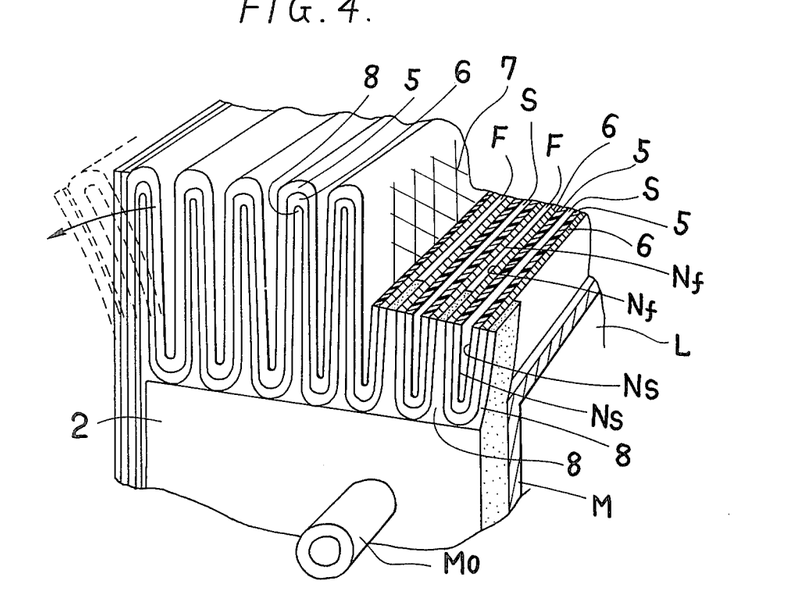
FIG. 4 is a fragmentary perspective view partly broken away and showing the semipermeable membrane module of the same.

Indicated at G, H are bearings for the water collector tube M, and at J, K seal members provided between the module E and the pressure resistant cylinder P. The tube M has a water collector channel L. The module E is provided with support rods Mo, Mt. The support rod Mt serves also as an outlet pipe for the water collector channel L.

The liquid treating unit So of the foregoing construction operates in the following manner.

A pressurized feed liquid is introduced into the unit in the direction of arrows A. By being regulated by the seal members J and K, the whole liquid flows horizontally into the passages S in the upper and lower membrane members 1, 1a of the module E. The liquid flows out as indicated by arrows B. While the feed liquid flows through the passages S, the pure water portion progressively seeps through the membranes 5 and is guided along the product liquid passages F and water collector channel L of the tube M as indicated by arrow C.

Since the feed liquid is introduced into the unit horizontally straight and parallel to the passages S as indicated by the arrows A but not at an angle as indicated by arrows D, the flow path includes no dead space, ensuring efficient separation. While such semipermeable membranes must be cleaned for efficient operation, the membranes included in the present unit are easy to clean because the feed liquid passages have open inlet and outlet ends and can be opened. When cleaning, the module E is withdrawn from the cylinder P, and the plastic cover 4 is opened by separation, whereby the membrane members 1, 1a are released to open the feed liquid passages.

The adhesive layers 2,3 can be liquid-tightly adhered to the recessed ends of the water collector tube M with high strength without the necessity of treating the surface of the tube, since it is made of sintered metal having micropores into which the adhesive penetrates.

In the embodiment described above, the upper and lower membrane members are joined to the opposite ends of the water collector tube M provided with the module supporting rods Mo, Mt, by the adhesive layers 2,3 provided in the recessed spaces formed in the entire end portions. However, the ends may be recessed by an amount corresponding to the width of the adhesive layer 8 only partially over a given distance from the rear faces of the adhesive layers 8 on the membrane members.

Further according to the embodiment described, the upper and lower membrane members are adhered to each other in an overlapping fashion at the opposite longitudinal ends of the constituent membranes, and the membrane members are also adhered to the side faces of the water collector tube M. Alternatively, the upper and lower membrane members may be individually joined to the side faces of the interposed water collector tube M.

Figures 5, 6:
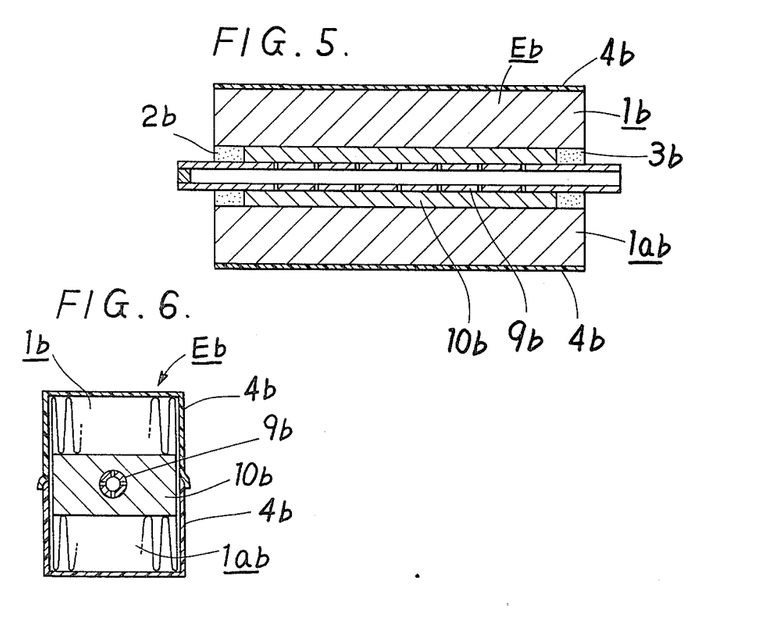
FIGS. 5 and 6 are views corresponding to FIGS. 1 and 3 respectively and showing a modification of the semipermeable membrane module.

FIGS. 5 and 6 show another water collector tube M which comprises a metal tubular portion 9b formed with a number of perforations and a rectangular parallelepipedal sintered metal portion 10b surrounding and joined to the metal tubular portion 9b.

The semipermeable membrane module may be modified as follows in the case where the liquid collector channel defining means is in the form of a rectangular parallelepiped.

Figure 7:
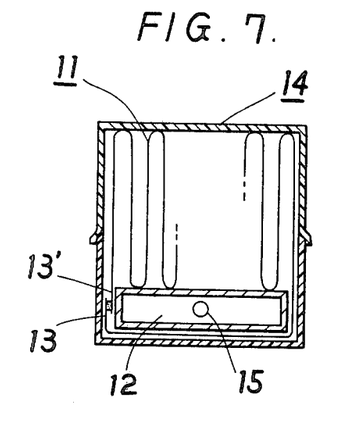
FIGS. 7 and 8 are views in cross section showing other modifications of the semipermeable membrane module and including liquid collector channel defining means in the form of a rectangular parallelepiped.

(i) FIG. 7 shows a semipermeable membrane module which comprises a semipermeable membrane member 11 joined to the top of a water collector tube 12 serving as liquid collector channel defining means and in which the longitudinal ends 13, 13' of the membrane surround the side faces and bottom face of the tube 12 and are joined to each other with an adhesive in an overlapping manner.

Figure 8:
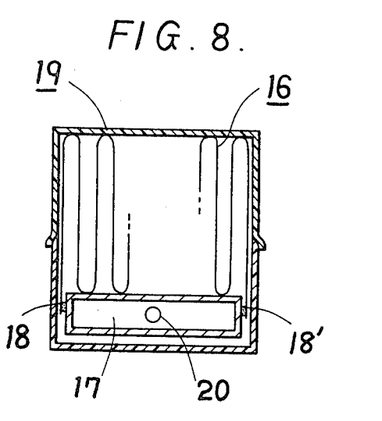

(ii) FIG. 8 shows another semipermeable membrane module which comprises a semipermeable membrane member 16 joined to the top of a water collector tube 17 and in which the longitudinal ends 18, 18' of the membrane are individually adhered to the side faces of the tube 17.

Figure 9:
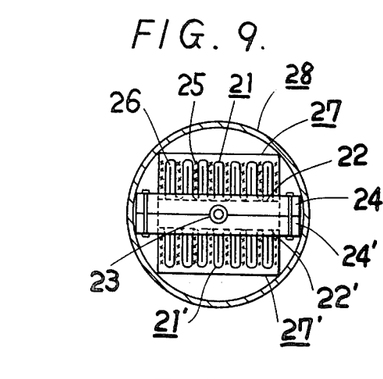
FIG. 9 is a view corresponding to FIG. 2 and showing another modification of the rectangular parallelepipedal semipermeable membrane module.
Figure 10:
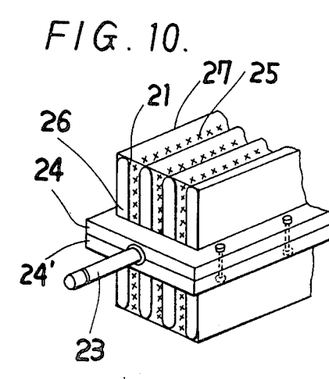
FIG. 10 is a fragmentary perspective view showing the same.

(iii) FIGS. 9 and 10 show another semipermeable membrane module which comprises separate upper and lower semipermeable membrane members 21 and liquid collector channel defining means. The channel defining means includes two perforated plates 22, 22' supporting and in contact with the membrane members 21 with product liquid passages facing the plates, and separable upper and lower frames 24, 24' surrounding the plates 22, 22' integrally therewith and having a water collector channel outlet pipe 23. The perforated plates 22, 22' which support the membrane members 21 with netlike spacers 25 inserted therein, and the outlet pipe 23 are fitted in the frame 24, 24' formed with an O-ring groove. The spaces between the inner peripheral portions of the frames and the membrane members 21 are sealed with an adhesive to separate the feed liquid passages from the product liquid passages. The frames with the upper and lower membrane members are fastened together by bolts and nuts with an O-ring inserted in the frames.

Figure 11:
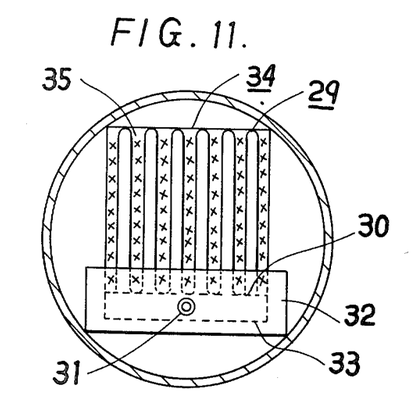
FIG. 11 is a view corresponding to FIG. 9 and showing another modification of the rectangular parallelepipedal semipermeable membrane module.

(iv) FIG. 11 shows another semipermeable membrane module comprising a semipermeable membrane member 29 and liquid collector channel defining means. The channel defining means includes a perforated upper plate 30 supporting the membrane member 29 in contact therewith, with product liquid passages facing the plate 30, a frame 32 having a water collector channel outlet pipe 31 and surrounding the upper plate 30 integrally therewith and a closing lower plate 33.

2. Liquid treating units of the pleat type including cylindrical means defining a liquid collector channel are described below.

Figure 12:
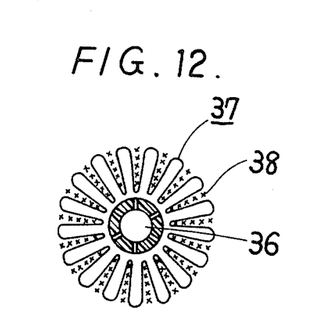
FIGS. 12 to 16 are cross sectional views showing various semipermeable membrane modules embodying this invention and including crylindrical liquid collector channel defining means.
Figure 13:
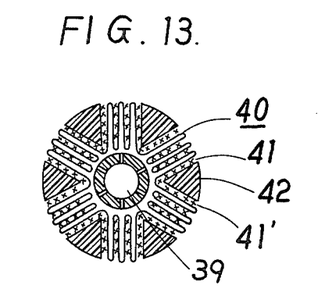
Figure 14:
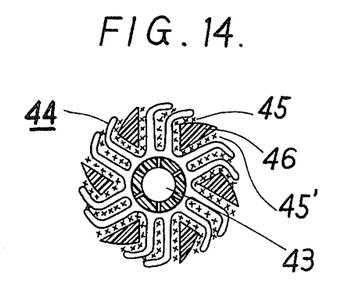
Figure 15:
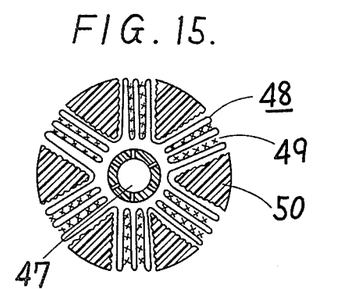

Liquid treating units of this type include those having folded leaves of a membrane extending radially from the cylindrical means and spaced apart uniformly circumferentially thereof as shown in FIG. 12 (to be hereinafter referred to as the "uniform type"), and those similar to the uniform type except that the folded leaves are divided into blocks with a filling member inserted into each space between the blocks as seen in FIGS. 13 to 15 (to be hereinafter referred to as the "block type").

With reference to FIG. 12, the uniform type unit comprises a water collector tube 36 serving as cylindrical channel defining means and folded leaves of a semipermeable membrane member 37 joined to the tube 36. To reduce the clearance between the leaves, there is the necessity of using a water collector tube of increased outside diameter or to use leaves of reduced radial length, namely to increase the number of the leaves relative to the membrane area. The leaf-to-leaf clearance is somewhat adjustable in accordance with the shape of the net spacer 38. To increase the speed of flow of the feed liquid relative to the membrane surface, there is the need to minimize the clearance, namely to minimize the space volume of the feed liquid passage.

To this end, with the embodiments shown in FIGS. 13 and 14, the semipermeable membrane leaves are divided into four to eight blocks, and a pair of netlike spacers (indicated at 41, 41' in FIG. 13, and at 45, 45' in FIG. 14) and a filling member (indicated at 42 in FIG. 13, and at 46 in FIG. 14) are placed into each space between the blocks. Thus the leaf-to-leaf clearance, namely the cross sectional area of the feed liquid passage, is minimized to increase to the greatest possible extent the speed of flow of the feed liquid relative to the membrane surface and to thereby ensure an improved separation efficiency.

Figure 16:
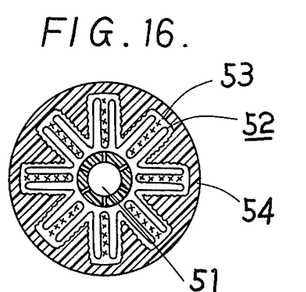

The same results are achievable with the embodiment shown in FIG. 15 in which the semipermeable membrane leaves are divided into four to eight blocks, and a filling member 50 having a large number of projections on its surface is inserted into each space between the blocks. The embodiment shown in FIG. 16 is similarly advantageous. In this embodiment the semipermeable membrane member is surrounded by an openable covering member integral with filling members 54 having a number of projections on its surface. These filling members are solid or hollow and made, for example, from hydrophobic plastics such as polyvinyl chloride or high-density polyethylene.

3. Liquid treating units incorporating elestic means for frictionally cleaning the membrane member are described below.

Figure 17:
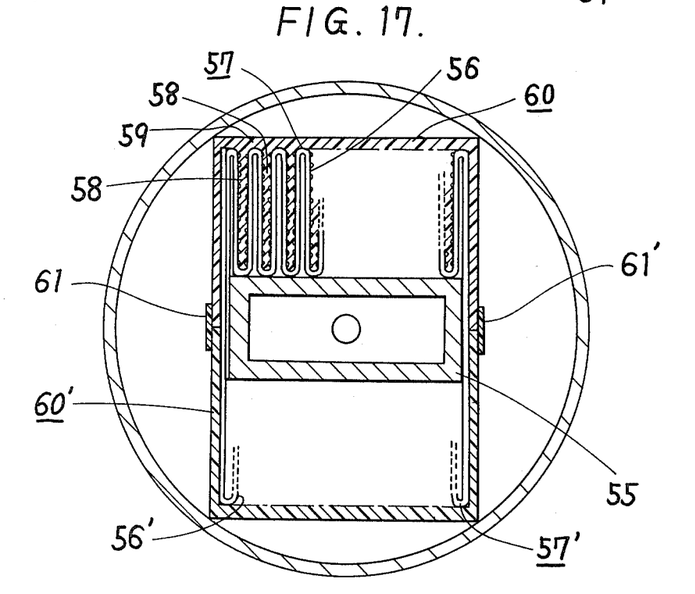
FIGS. 17 and 18 are cross sectional views corresponding to FIG. 3 and showing semipermeable membrane modules embodying this invention and including an integral spacer for feed liquid passages, the spacer being adapted for frictional cleaning of the membrane.
Figure 18:
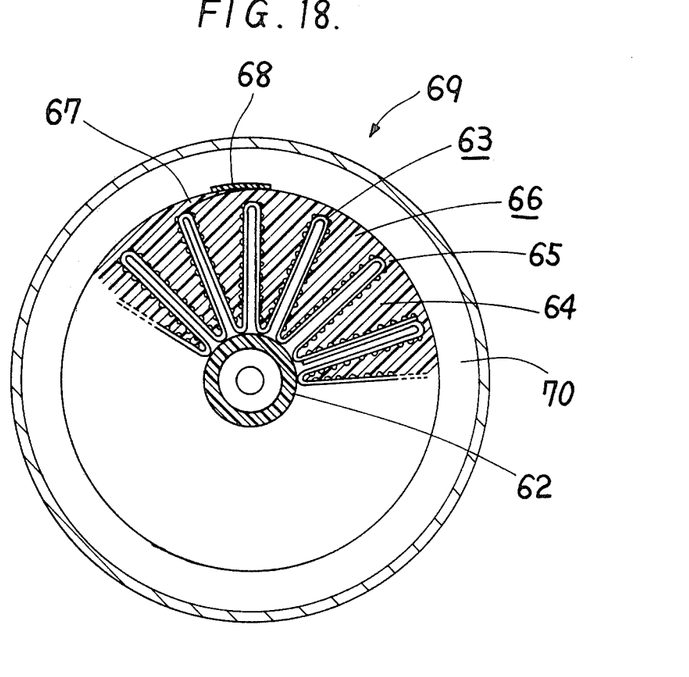

FIGS. 17 and 18 show such embodiments in which the feed liquid passages are provided with elastic spacers (indicated at 58 in FIG. 17, and at 64 in FIG. 18) which are formed as an integral member for frictionally cleaning the whole membrane member in sliding contact therewith.

The elastic cleaning means is elastically slidable on the membrane member to frictionally remove stain or deposition from the membrane surface defining the feed liquid passages. More specifically, the cleaning means comprises filling members extending from a cover surrounding the assembly of the semipermeable membrane member and liquid collector channel defining means into the feed liquid passages in intimate contact with the passage defining surfaces. The filling members are formed with a number of projections on the opposite surfaces thereof. During the treatment of the feed liquid, the filling members function as spacers for suitably regulating the cross sectional area of the feed liquid passages and producing a turbulence, permitting the liquid to flow at an increased speed relative to the membrane surface. When moved on the membrane surface defining the feed liquid passages in elastic sliding contact therewith, the filling members act to remove stain or deposition therefrom. With the projections of the filling members in elastic contact with the membrane surface, the feed liquid flows substantially through the spaces formed between the membrane surface and the indented portions of the filling members. The above-mentioned cover joins together the filling members which are individually provided for the feed liquid passages, so that the filling members are movable for cleaning merely by moving the cover. The filling members are joined to the cover with use of high frequency wave or shaped integrally with the cover.

Preferably the elastic cleaning means is made from flexible hydrophobic plastics such as non-rigid polyvinyl chloride or high-density polyethylene or from rubber in the form of a solid or hollow piece.

Examples of useful filling members are porous plastics or rubber plates, nets or comblike thin plates of plastics formed by extrusion and other pieces having a number of projections on the surface. Preferably the projections are formed by embossing.

The liquid treating unit shown in FIG. 17 consists mainly of a water collector tube 55 of sintered metal serving as liquid collector channel defining means, semipermeable membrane members 57, 57' provided on and beneath the tube 55, and upper and lower elastic cleaning means 60, 60' separable from each other and fitting around the membrane members 57, 57'. Each of the cleaning means 60, 60' comprises filling members 58 and a cover 59 integral with the outer ends of the filling members, the filling members being inserted into the feed liquid passages and formed with a large number of small disk-shaped projections on their surfaces. The cleaning means 60, 60' are joined together with adhesive tapes 61, 61'. When the membrane members are to be cleaned, the tapes 61, 61' are removed to separate the cleaning means 60, 60', and the membrane members 57, 57' are freed from intimate contact with the cleaning means. The elastic cleaning means 60 or 60' is then horizontally reciprocally moved by hand or some other suitable means on the membrane member 57 or 57' along the feed liquid passages, whereby the projections on the surfaces of the filling members 58 are elastically slidingly moved over the entire surface of the membrane defining the passages to forcibly remove the deposition therefrom. The projections are provided, for example, in a staggered arrangement at spacings smaller than the diameter of the projections. This ensures an effective frictional cleaning operation over the entire membrane surface.

In this way, the membrane members 57, 57' can be cleaned by the means 60, 60' efficiently with improved effectiveness.

Unlike the above construction, the treating unit shown in FIG. 18 includes a cylindrical water collector tube 62. The unit comprises a semipermeable membrane member 63 and elastic cleaning means 66 provided with filling members 64. One end of the means 66 is tapered in the circumferential direction as indicated at 67 and is joined to the other end of the means with an adhesive sheet 68, whereby the cleaning means 66 is held to the membrane member 63. The filling members 64 are provided with projections as in the foregoing embodiment.

To clean the membrane member, the adhesive sheet 68 is removed from the tapered end 67 to release the membrane member 63 from intimate contact with the means 66, which is then reciprocally moved by suitable means axially of the unit. Thus the surface of the membrane member 63 defining the feed liquid passages can be wholly cleaned with ease.

The following experiments will clarify the effects achieved by pleat-type liquid treating units of this invention.

EXPERIMENT 1

An experiment was carried out with use of a liquid treating unit of this invention having rectangular parallelepipedal means defining a liquid collector channel and a conventional spiral-type liquid treating unit for comparison.

A membrane of cellulose diacetate was formed on a fabric ("Sailing Cloth No. 601," trademark of Mills Travis Co.) by the usual method. The resulting membrane with the backing fabric achieved NaCl removal efficiency of 95.2% and water penetration rate of 1.4 $m^3/m^2$ per day when tested with use of 1500 ppm NaCl solution at pressure of 40 $kg/cm^2$, temperature of 25° C. and flow speed of 1 m/sec.

Modules were prepared with use of the membrane according to the following specifications and tested for performance with the results given in Table 1.

TABLE 1

|  | Unit of the invention | Conventional unit |
|---|---|---|
| Dimensions of module (mm) |  |  |
| Cross section | 70 × 70 | 95 (diam.) |
| Length | 1000 | 90 |
| Membrane number |  |  |
| Length of leaves (mm) | 25* | 1500 |
| Number of leaves | 160 | 2 |
| Membrane area (m²/module) | 8 | 6 |

TABLE 1-continued

|  | Unit of the invention | Conventional unit |
|---|---|---|
| Dimensions of pressure resistant cylinder (mm) | | |
| Inside diameter | 102 | 102 |
| Length | 1100 | 1100 |
| Membrane area per unit volume of cylinder ($m^2/m^3$) | 890 | 666 |
| Membrane performance** | | |
| NaCl removal efficiency (90) | 94.2 | 94.0 |
| Water penetration rate ($m^3/m^2$ . day) | 1.35 | 1.02 |

*Vertical length of leaves.
**Determined with use of 1500 ppm N Cl solution at pressure of 40 kg/cm², temperature of 25° C. and feed rate of 20 l/min.

Table 1 shows that the unit of this invention has an increased membrane packing density, reduced resistance to the penetration of water through the membrane and improved membrane performance.

EXPERIMENT 2

An experiment was conducted with use of units of this invention having cylindrical means defining a liquid collector channel for comparison between the uniform type and the block type.

A semipermeable membrane was formed from cellulose diacetate by the known method, and modules were prepared with the use of the membrane according to the specifications listed in Table 2 and tested for membrane performance with use of 1500 ppm NaCl solution at pressure of 40 kg/cm², flow rate of 1 m³/hr. and temperature of 25° C. The results are also shown in Table 2.

TABLE 2

|  | Block Type | Uniform type |
|---|---|---|
| Module Specifications | | |
| Outside diameter (mm) | 97 | 97 |
| Length (mm) | 1000 | 1000 |
| Length of leaves (mm)* | 30 | 30 |
| Number of leaves | 144 (6 blocks) | 144 |
| Outside diameter of water collector tube (mm) | 37 | 37 |
| Effective cross sectional area of flow passages (cm²) | 15.4 | 28 |
| Operating condition | | |
| Flow speed (m/sec.)** | 0.18 | 0.099 |
| Membrane performance | | |
| NaCl removal efficiency (%) | 93.8 | 90 |
| Water penetration rate ($m^3/m^2$ . day) | 1.20 | 1.12 |

*Radial length of leaves
**Flow speed relative to the membrane surface when the feed liquid was supplied to the unit at a rate of 1 m³/hr.

Table 2 reveals that the block-type module is 1.8 times as high as the uniform type in the flow speed relative to the membrane surface and therefore achieves improved performance due to the increased flow speed. The block-type module is very advantageous for use in the present unit which is relatively simple in construction.

EXPERIMENT 3

A semipermeable membrane was formed from cellulose diacetate by the known method. A module having frictional cleaning means (shown in FIG. 18) and another module of the uniform type were prepared according to this invention with use of the membrane according to the specifications listed in Table 3. The modules were tested for membrane performance and cleaning effect with use of carboxymethyl cellulose serving as a staining accelerating agent and 1500 ppm NaCl solution under the operating conditions of: pressure, 40 kg/cm²; flow rate, 1 m³/hr; and temperature, 25° C.

TABLE 3

|  | Cleaning type | Uniform type |
|---|---|---|
| Module specifications | | |
| Outside diameter (mm) | 97 | 97 |
| Length (mm) | 1000 | 1000 |
| Length of leaves (mm) | 28 | 30 |
| Number of leaves | 130 | 144 |
| Outside diameter of water collector tube (mm) | 37 | 37 |
| Filling members | Embossed* | Net-like** |
| Membrane performance | | |
| NaCl removal efficiency (90) | | |
| 50 hours later | 91.5 | 92 |
| 500 hours later | 92.0 | 92.2 |
| After cleaning | 91.8 | (92.0)*** |
| Water penetration rate ($m^3/m^2$ . day) | | |
| 50 hours later | 0.95 | 0.95 |
| 500 hours later | 0.74 | 0.76 |
| After cleaning | 0.91 | (0.93)*** |

*The filling member had a cross section of 1.5 mm (base) × 0.2mm (top) × 28 mm (height) and 1-mm-diameter projections at a pitch of 2 mm.
**The net-like filling member had a thickness of 0.6 mm and was composed of 0.5-mm-diameter plastics filament at a pitch of 2 mm.
***Manually cleaned with soft polyurethane foam.

Table 3 shows that the cleaning-type module of this invention can be cleaned as effectively as when the uniform-type module is cleaned with the soft polyurethane foam. However, in view of the cumbersome procedure of removing the filling members and manually cleaning the membrane needed in the latter case, the simple cleaning means of this invention is very useful.

Figure 19:
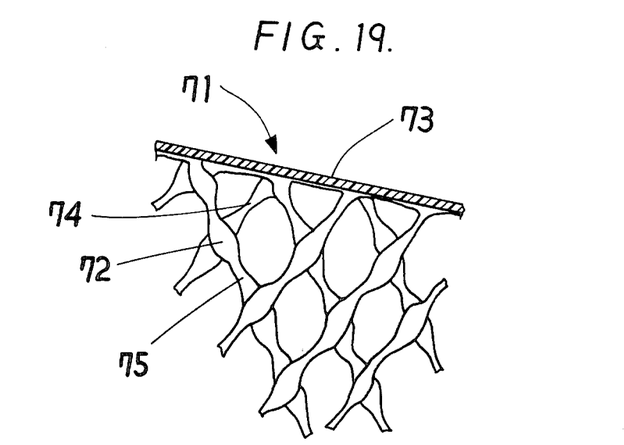
FIG. 19 is a fragmentary perspective view showing a modification of the spacer.

FIG. 19 shows a net-like filling member 71 which is a modification of the filling member 58 shown in FIG. 17.

We claim:

1. A liquid treating unit to separate an entering liquid into a product liquid and a non-diffused liquid comprising a pressure resistant hollow cylinder, a semipermeable membrane module housed in the cylinder and seal means closing the space defined by the module and the cylinder to force the entering liquid to flow substantially horizontally across said module, the semipermeable membrane module comprising:
   (a) means defining a liquid collector channel for collecting the product liquid for recovery, said channel positioned concentrically within said cylinder such that the product liquid flows in the same direction as the entering liquid,
   (b) at least one semipermeable membrane member connected to the channel defining means and made from a semipermeable membrane strip of synthetic resin, the membrane being alternately folded longitudinally thereof to provide a plurality of feed liquid passages on its front side and a plurality of product liquid passages on its rear side and to direct the non-diffused liquid in the same direction as the entering liquid,
   (c) an adhesive layer adhering each pair of product liquid passage defining leaf portions of the membrane at each end of the passage to liquid-tightly close the product liquid passage only, the adhesive layer further liquid-tightly adhering the semipermeable membrane member at least to the periphery of the channel defining means, (d) spacers inserted into the feed liquid passages, in operative bridging engagement with adjacent feed liquid passage defining leaf portions of the membrane, (e) an openable covering member surrounding the outer periphery of the semipermeable membrane member, (f) a backing fabric attached to the entire surface of said semipermeable membrane defining the product liquid passages;

whereby the product liquid flows through said cylinder in substantially the same direction as the entering liquid and the non-diffused liquid.

2. A liquid treating unit as defined in claim 1 wherein the covering member is a plastics cover.

3. A liquid treating unit as defined in claim 1 wherein the channel defining means is rectangular parallelepipedal, and two semipermeable membrane members are continuously provided on and beneath the channel defining means in contact therewith, the opposed ends of the membrane strips overlapping and being joined to each other on each side of the channel defining means, each of the spacers being a net-like spacer.

4. A liquid treating unit as defined in claim 1 wherein the channel defining means is rectangular parallelepipedal, and two semipermeable membrane members are individually provided on and beneath the channel defining means in contact therewith, the opposite longitudinal ends of the membrane strips being joined to the opposite sides of the channel defining means, each of the spacers being a net-like spacer.

5. A liquid treating unit as defined in claim 1 wherein the channel defining means is rectangular parallelepipedal, and the semipermeable membrane member is joined to the top of the channel defining means, the opposite longitudinal ends of the membrane strip surrounding the two side faces and bottom face of the channel defining means and being joined to each other with an adhesive in an overlapping fashion, each of the spacers being a net-like spacer.

6. A liquid treating unit as defined in claim 1 wherein the channel defining means is rectangular parallelepipedal, and the semipermeable membrane member is joined to the top of the channel defining means, the opposite longitudinal ends of the membrane strip being individually adhered to the two side faces of the channel defining means, each of the spacers being a net-like spacer.

7. A liquid treating unit as defined in claim 1 wherein the channel defining means comprises upper and lower two perforated plates individually supporting upper and lower two separate membrane members in contact with the product liquid passage defining surfaces thereof and a frame surrounding the perforated plates integrally therewith and having a product liquid outlet, the frame being separable into an upper and a lower portion.

8. A liquid treating unit as defined in claim 1 wherein the channel defining means comprises a perforated upper plate in contact with the product liquid passage defining surface of the membrane member, a frame surrounding the perforated upper plate integrally therewith and having a product liquid outlet and a closing bottom plate.

9. A liquid treating unit as defined in claim 1 wherein the channel defining means is cylindrical, and the membrane member is continuously provided around and centered about the channel defining means in contact therewith, the opposite ends of the membrane strip being joined to each other with an adhesive in an overlapping fashion.

10. A liquid treating unit as defined in claim 9 wherein each of the spacers is a net-like spacer.

11. A liquid treating unit as defined in claim 9 wherein the spacers are net-like spacers, paired net-like spacers and a filling member inserted between each pair of net-like spacers.

12. A liquid treating unit as defined in claim 9 wherein the spacers are net-like spacers, and filling members each having a number of projections on its surface.

13. A liquid treating unit as defined in claim 9 wherein the spacers are net-like spacers, and filling members integral with the covering member and each formed with a number of projections on its surface.

14. A liquid treating unit as defined in claim 1 wherein the spacers are frictional cleaning elastic members each formed on its surface with a number of projections in elastic contact with the membrane surface defining the feed liquid passages, the elastic members being slidable on the membrane member for cleaning.

* * * * *

UNITED STATES PATENT OFFICE
CERTIFICATE OF CORRECTION

Patent No. 4,235,722　　　　　　　　　Dated November 25, 1980

Inventor(s) Yasuhiro Sakaguchi

It is certified that error appears in the above-identified patent and that said Letters Patent are hereby corrected as shown below:

Column 1, line 22:　"802791975)" should read　-- 80279/1975)--.

Column 2, line 13:　"crylindrical" should read --cylindrical--.

Column 4, line 13:　"1,1." should read -- 1, 1a. --.
Column 9, line 10:　"(90)" should read --(%)--.
Column 9, line 13:　"N Cl" should read -- NaCl --.
Column 10, line 17:　"(90)" should read --(%)--.

Signed and Sealed this

Twenty-eighth Day of April 1981

[SEAL]

Attest:

RENE D. TEGTMEYER

Attesting Officer　　Acting Commissioner of Patents and Trademarks